US008566618B2

(12) United States Patent
Floyd et al.

(10) Patent No.: US 8,566,618 B2
(45) Date of Patent: Oct. 22, 2013

(54) RELIABLE SETTING OF VOLTAGE AND FREQUENCY IN A MICROPROCESSOR (75) Inventors: Michael S. Floyd, Austin, TX (US);
Karthick Rajamani, Austin, TX (US);
Juan C. Rubio, Austin, TX (US);
Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 12/573,284

(22) Filed: Oct. 5, 2009

(65) Prior Publication Data
US 2011/0083021 A1    Apr. 7, 2011

(51) Int. Cl.
*G06F 1/00* (2006.01)
*G06F 1/26* (2006.01)

(52) U.S. Cl.
USPC ............ 713/300; 713/320; 713/322; 455/510

(58) Field of Classification Search
USPC ......................... 713/300, 320, 322; 455/510
See application file for complete search history.

(56) References Cited

U.S. PATENT DOCUMENTS

| 7,190,689 | B2 | 3/2007 | Sato et al. |
| 2003/0095498 | A1 | 5/2003 | Sato et al. |
| 2007/0291646 | A1 | 12/2007 | Ohishi et al. |
| 2009/0031155 | A1 | 1/2009 | Hofmann et al. |

FOREIGN PATENT DOCUMENTS

| CN | 101036120 A | 9/2007 |
| CN | 101187831 A | 5/2008 |
| EP | 1871031 A2 | 12/2007 |

OTHER PUBLICATIONS

Towsley, D., The Stutter Go Back-N ARQ Protocol, IEEE Transactions on Communications, Jun. 1979, pp. 869-875, vol. 27, Issue 6.

*Primary Examiner* — Kim Huynh
*Assistant Examiner* — Michael J Brown
(74) *Attorney, Agent, or Firm* — Yudell Isidore Ng Russell PLLC (57) ABSTRACT Managing operations associated with one or more voltage changes and one or more frequency changes. A voltage change request and a frequency change request are associated with dynamic voltage and frequency scaling (DVFS) operations. The DVFS operations are transmitted by the processors to be executed by one or more direct current assemblies. A sequence associated with the one or more voltage changes and a sequence associated with the one or more frequency changes are detected by the system. The sequences are dynamically modified to enable insertion of an additional voltage change, whereby the additional voltage change indicates completion of one or more previous voltage change requests. Completion of the voltage change request enables one or more subsequent voltage change requests to be processed. When a voltage change request is not successfully completed one or more future voltage changes are suspended.

20 Claims, 5 Drawing Sheets

RELIABLE SETTING OF VOLTAGE AND FREQUENCY IN A MICROPROCESSOR

BACKGROUND

1. Technical Field

The present invention generally relates to processors and in particular to dynamic voltage and frequency scaling within a microprocessor.

2. Description of the Related Art

Multiple high end system architectures supply redundant power sources to one or more processors. The system architecture comprises a current-sharing power supply such as a Direct Current Assembly (DCA), whereby the DCA positions a microcontroller in between the processors and voltage regulator modules (VRMs). When a voltage change request is made by the processor to the DCA, errors in the request transmission can occur. The errors include, but are not limited to, failed delivery of the voltage change request due to noise in the communication channel, failure in the VRM, and/or failed delivery of the response affirming whether the voltage change request succeeded or failed.

Several suggested solutions exist which allow the voltage change request within the high end system architecture to be processed and confirmed. A first suggested solution includes issuing a "poll" command by the processor, following each voltage command, to determine status of a voltage change request. Issuing a polling command utilizes additional bandwidth between the processor and the DCA, and thereby consuming bandwidth designated to other operations. Consuming additional processor bandwidth utilizes bandwidth needed for system power management sensors, and therefore adversely affecting the quality of power management within the system architecture. A second suggested solution includes transmitting a "complete voltage transition" signal from the DCA to the processor. Transmitting the "complete voltage transition" signal requires additional input/output pins for each voltage domain and the pins are shared to provide a scalable solution for the high end system architecture. However, when the one or more input/output pins are shared, the processor has difficulty determining which of the DCAs sent the "complete voltage transition" signal. Therefore the voltage change request is not completed. The suggested solutions are neither optimal nor preferred solutions.

SUMMARY OF ILLUSTRATIVE EMBODIMENTS

Disclosed are a method, a system and a computer program product for managing operations associated with one or more voltage changes and one or more frequency changes. A voltage change request and a frequency change request are associated with dynamic voltage and frequency scaling (DVFS) operations. The frequency change operations are performed by the processor(s). The voltage change requests are transmitted by the processors to be executed by one or more direct current assemblies (DCAs). A sequence associated with the one or more voltage change operations and a sequence associated with the one or more frequency change operations are detected by the system. The sequences are dynamically modified to enable insertion of an additional voltage change request at the end of a sequence of voltage change operations, whereby the additional voltage change request indicates completion of one or more previous voltage change requests. Completion of the voltage change request enables one or more subsequent voltage change requests to be processed. When a voltage change request is not successfully completed, one or more future voltage changes are suspended.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a computer program product for managing operations associated with one or more voltage changes and one or more frequency changes. A voltage change request and a frequency change request are associated with dynamic voltage and frequency scaling (DVFS) operations. The frequency change operations are performed by the processor(s). The voltage change requests are transmitted by the processors to be executed by one or more direct current assemblies (DCAs). A sequence associated with the one or more voltage change operations and a sequence associated with the one or more frequency change operations are detected by the system. The sequences are dynamically modified to enable insertion of an additional voltage change request at the end of a sequence of voltage changes, whereby the additional voltage change request indicates completion of one or more previous voltage change requests. Completion of the voltage change request enables one or more subsequent voltage change requests to be processed. When a voltage change request is not successfully completed, one or more future voltage changes are suspended.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
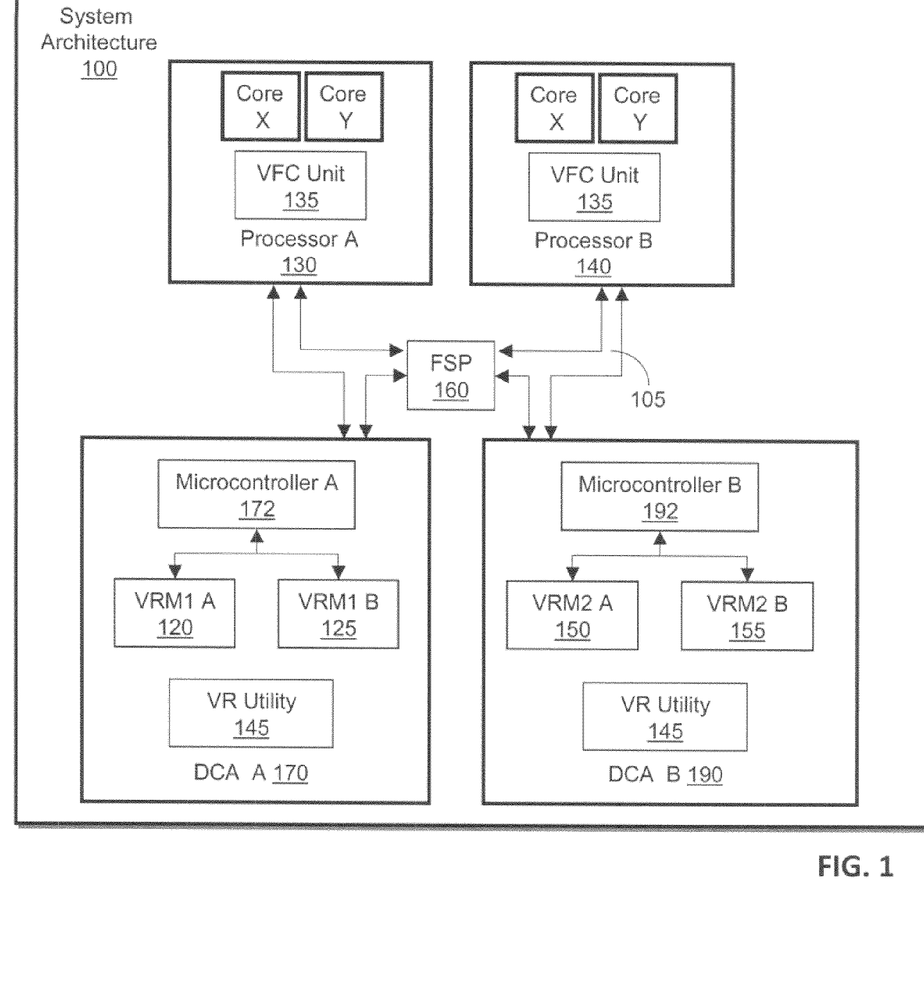
FIG. 1 provides a block diagram representation of an example high end system architecture within which the invention is practiced, according to one embodiment of the invention.

With reference now to the figures, and beginning with FIG. 1, there is depicted a block diagram representation of an example high end system architecture, as utilized within one embodiment. As illustrated, System architecture 100 comprises one or more central processing units (of which processor A 130 and processor B 140 are illustrated) and each processing unit includes a voltage and frequency control unit (VFCU). Processor A 130 and processor B 140 each include VFCU 135. The voltage and frequency control units (VFCU 135) within processor A 130 and processor B 140 operate simultaneously and/or independently of one another. Processor A 130 and processor B 140 communicate with a standard service processor called the flexible support processor (FSP) 160 via system interconnect/bus 105. Also connected to system interconnect/bus 105 are direct current assembly (DCA) A 170 and DCA B 190. Within DCA 170 are one or more voltage regulator modules (VRMs), VRM1 A 120 and VRM1 B 125, communicating with microcontroller A 172. Similarly, within DCA B 190, VRM2 A 150 and VRM2 B 155 are communicating with microcontroller B 192.

In addition to the above described hardware components of System architecture 100, various features of the invention are completed/supported via software (or firmware) code or logic stored within DCA A 170 and DCA B 190 and executed by microcontroller A 172 and microcontroller B 192. Thus, for example, illustrated within DCA A 170 and DCA B 190 are voltage regulation (VR) utility 145, which executes on microcontroller A 172 and microcontroller B 192 to provide voltage regulation logic. In actual implementation, VR utility 145 may be combined with or incorporated with operations of FSP 160 and/or one or more other components within system architecture 100, to provide a single executable component, collectively providing the various functions of each individual software component when the corresponding combined code is executed by microcontroller A 172 and/or microcontroller B 192. For simplicity, VR utility 145 is illustrated and described as a stand alone or separate software/firmware component, which provides specific functions, as described below. In the illustration of FIG. 1, VR utility 145 is depicted within DCA A 170 and DCA B 190. Although VR utility 145 is shown in two locations, VR utility 145 operates as a single utility.

In one embodiment, VFCU 135 receives instructions to perform a DVFS operation. VFCU 135 communicates with microcontroller A 172 and microcontroller B 192, respectively, which execute VR utility 145. Certain functions supported and/or implemented by VR utility 145 generate processing logic executed by processor and/or device hardware to complete the implementation of that function. For simplicity of the description, the collective body of code that enables these various features is referred to herein as VR utility 145. Among the software code/instructions/logic provided by VR utility 145, and which are specific to the invention, are: (a) code/logic for dynamically modifying a sequence of one or more voltage change operations and a sequence of one or more frequency change operations, wherein modifying the sequence includes shifting a voltage change forward relative to a corresponding frequency change operations; (b) code/logic for automatically inserting an indicator voltage change at an end of the sequence of the one or more voltage changes; and (c) code/logic for detecting execution of the indicator voltage change, wherein detection of the indicator voltage change signifies completion of one or more previous voltage change requests. According to the illustrative embodiment, when VFCU 135 receives instructions to perform a DVFS operation via VR utility 145, system architecture 100 initiates a series of functional processes that enable the above functional features as well as additional features/functionality. These features/functionalities are described in greater detail below within the description of FIGS. 2-5.

Those of ordinary skill in the art will appreciate that the hardware components and basic configuration depicted in FIG. 1 may vary. The illustrative components within system architecture 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The system architecture depicted in FIG. 1 may be, for example, associated with IBM POWER series microprocessors, a product of International Business Machines Corporation in Armonk, N.Y., which are utilized as the main central processing unit in many of IBM's servers, minicomputers, workstations, and supercomputers.

Figure 2:
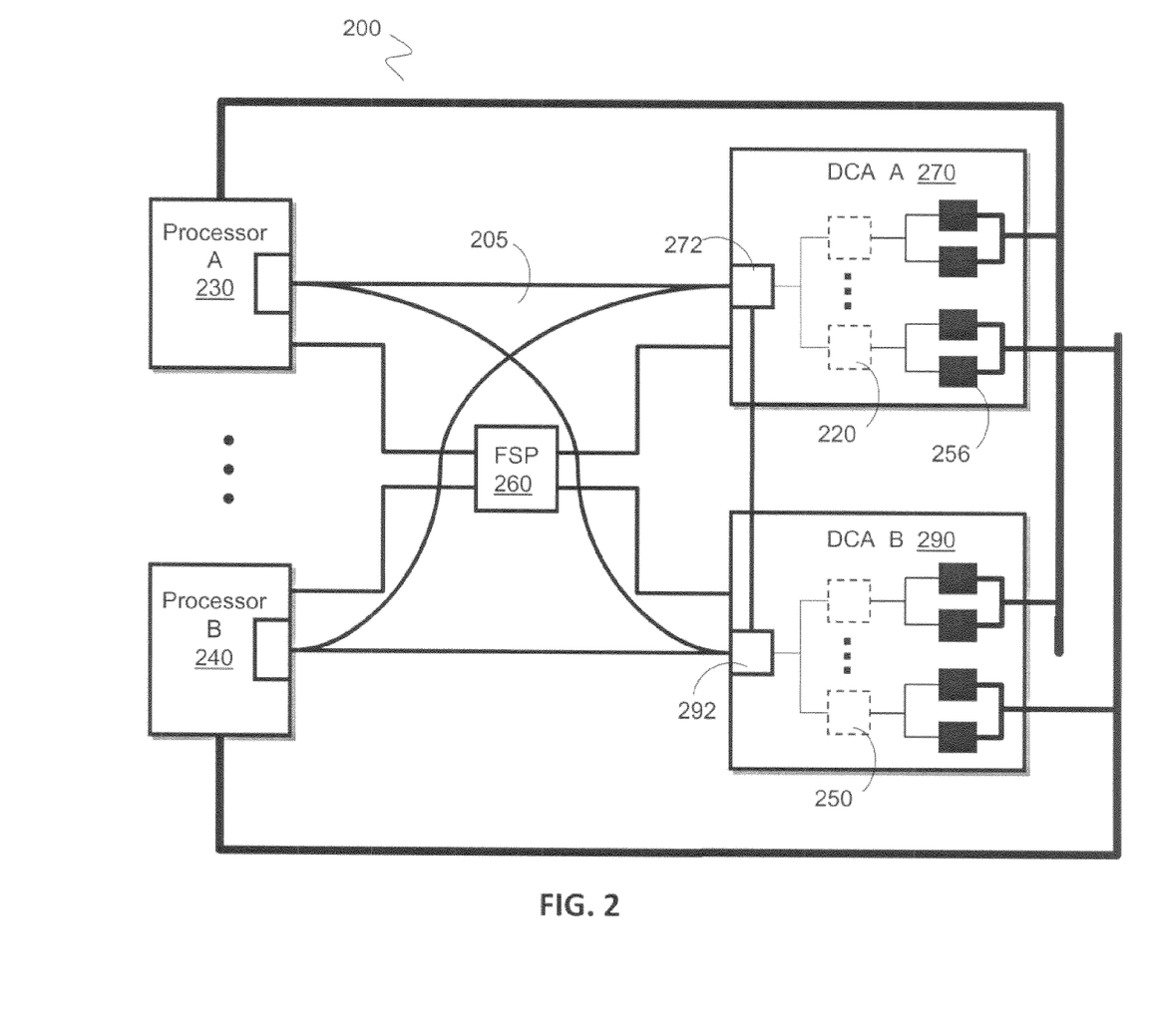
FIG. 2 is a block diagram representation of one or more microprocessors associated with one or more voltage regulator modules, a flexible support processor (FSP), and one or more direct current assemblies, according to one embodiment of the invention.

With reference now to FIG. 2. FIG. 2 illustrates interconnectivity between one or more microprocessors which are associated with one or more voltage regulator modules. Additionally, the microprocessors are associated with a flexible support processor, and one or more direct current assemblies. System architecture 200 includes processor A 230 and processor B 240 communicating with flexible hardware support processor (FSP) 260. Processor A 230, processor B 240, and FSP 260 communicate with direct current assembly (DCA) A 270 and DCA B 290. DCA A 270 and DCA B 290 include voltage regulator module (VRM) A 220 and VRM B 250, respectively. Microcontroller A 272 communicates with VRM A 220 within DCA 270, and microcontroller B 292 communicates with VRM B 250 within DCA B 290. Microcontroller A 272 and microcontroller B 292 also enable communication between the DCAs (DCA A 270 and DCA B 290). DCA A 270 and DCA B 290 each contain one or more voltage regulation slave devices 256. System interconnect bus 205 is utilized to connect the processors, FSP (processor A 230 and processor B 240) and DCAs (DCA A 270 and DCA B 290) within system architecture 200. System interconnect bus 205 may be, for example, an industry standard inter-integrated circuit (I2C) interface.

In one embodiment, DCA A 270 and DCA B 290 provide power to processor A 230 and processor B 240. Processor A 230 and processor B 240 receive redundant power connections from one or more DCAs (DCA A 270 and DCA B 290) to ensure power supply to the processors in the case of DCA and/or other component (e.g. VRM) failure. VRM A 220 and VRM B 250, similar to VRM A 120 and VRM B 150 (of FIG. 1) are each located within DCA A 270 and DCA B 290 and receive instruction from the VR utility (145 of FIG. 1). The respective voltages of processor A 230 and processor B 240 are controlled by one or more of VRM A 220 and VRM B 250. When one or more components fail within system architecture 200, the processors (processor A 230 and processor B 240) will employ a different VRM (i.e. the VRM that is operable) to control the voltage required for operation of the respective processor(s).

In another embodiment, the power provided to one or more processors (processor A 230 and processor B 240) is controlled via dynamic voltage and frequency scaling (DVFS) operations. Each DVFS operation consists of a first sequence of voltage change request (or voltage change transitions among one or more voltage change operations) and a second sequence frequency change request (or frequency transitions among one or more frequency change operations). Each voltage change request in the first sequence corresponds with a frequency change request in the second sequence. When the DVFS operation is received by processor A 230 and/or processor B 240, VFCU (135 of FIG. 1) shifts the first sequence of voltage change operations forward relative to the second sequence of corresponding frequency changes. VFCU (135 of FIG. 1) sends voltage request change to DCA A 270 and/or DCA B 290. An additional voltage change request is added to the end of the first sequence of shifted voltage change operations and/or requests. When the DVFS operation is executed, the acknowledgement of the voltage change request data packet is an indicator voltage change that signifies the completion of the previous voltage change operation.

In one embodiment, a voltage change request and/or frequency change request is provided within the DVFS operation. Within system architecture 200 DCA A 270 and DCA B 290 are voltage regulation slave devices. DVFS operations are initiated by processor A 230 and processor B 240. VRM A 220 and VRM B 250 receive the request for initiation of the DVFS operation (voltage change request and frequency change request), and the VRMs set the operating voltage as defined by the DVFS operation. DCA A 270 and DCA B 290 execute the DVFS operation, providing power to processor A 230 and processor B 240 as defined by the DVFS request.

In another embodiment, when a DVFS operation is received, VR utility, communicating instructions to VRM A 220 and VRM B 250, enable DCA A 270 and DCA B 290 to transmit a fail "NACK" response or succeed "ACK" response to processor A 230 and processor B 240. The fail "NACK" response or succeed "ACK" response acknowledges whether or not the one or more DCAs will proceed with processing/executing the DVFS operation. Specifically, an "ACK" (succeed) response from a DCA to a processor conveys to the processor that there are no previous errors and the DVFS operation (voltage change request and/or frequency change request) is commencing. The "NACK" (fail) response from the DCA to the processor conveys that no new requests are accepted (i.e. no new request will commence) currently due to a communication error, component failure, and/or because processing of the previous DVFS operation is not complete.

In one embodiment, VR utility 145 (FIG. 1) manages the DVFS operations within system architecture 200. One or more DCAs supply power to one or more processors. VR utility communicates with VRM A 220 and/or VRM 250 to identify the one or more DCAs supplying power to the one or more processors. For example, processor A 230 is receiving power from DCA A 270. VRM A 220 controls the power supplied by DCA A 270 to processor A 230. When DCA A 270 and/or VRM A 220 fail, are removed, or when the communication with DCA A 270 and/or VRM A 220 fails, VR utility identifies the component causing the failure and dynamically transfers the DVFS operation from the failed component to one or more working components (i.e. DCA B 290 and/or VRM B 250). The DVFS operation is processed utilizing the available working components.

In another embodiment, a DCA (e.g. DCA 270) fails and/or the DCA is available when servicing DVFS request from the processor. For instance, when DCA 270 fails while servicing DVFS requests from the processor, processor A 230 attempts communication with DCA A 270 N times (where 'N' is a predefined number). The operation is cancelled when a success response is not received after N times. VR utility enables a failed alert to be transmitted to FSP 260. The failed alert identifies the removed DCA (DCA A 270). Future DVFS operations (e.g. frequency changes and voltage changes) issued/transmitted by the processor to the removed DCA (e.g. DCA A 270) are prevented. When a DVFS operation is not being processed/executed and DCA B 290 realizes DCA A 270 is removed, a fail alert is sent to FSP 260 reporting the removal of DCA A 270. VR utility enables FSP 260 to prevent transmission of future DVFS operations to the removed DCA (DCA A 270).

In another instance, all DCAs (DCA A 270 and DCA B 290) are available for processing one or more DVFS operations and one or more failures occur (e.g. communication failure within system interconnect bus 205 or VRM component failure). During a DVFS operation VR utility enables DCA A 270 and/or DCA B 290 to requests the initial operating voltage of FSP 260. Subsequently, DCA A 270 and/or DCA B 290 perform one or more voltage change operation relative to the initial operating voltages received from FSP 260. When a failure occurs outside of a DVFS operation, DCA A 270 and/or DCA B 290 requests an initial operating voltage from FSP 260. Upon receiving the initial operating voltage from FSP 260, VR utility and/or FSP 260 enable DCA A 270 and/or DCA B 290 to perform voltage change operations relative to the initial operating voltage provided by FSP 260.

Figure 3:
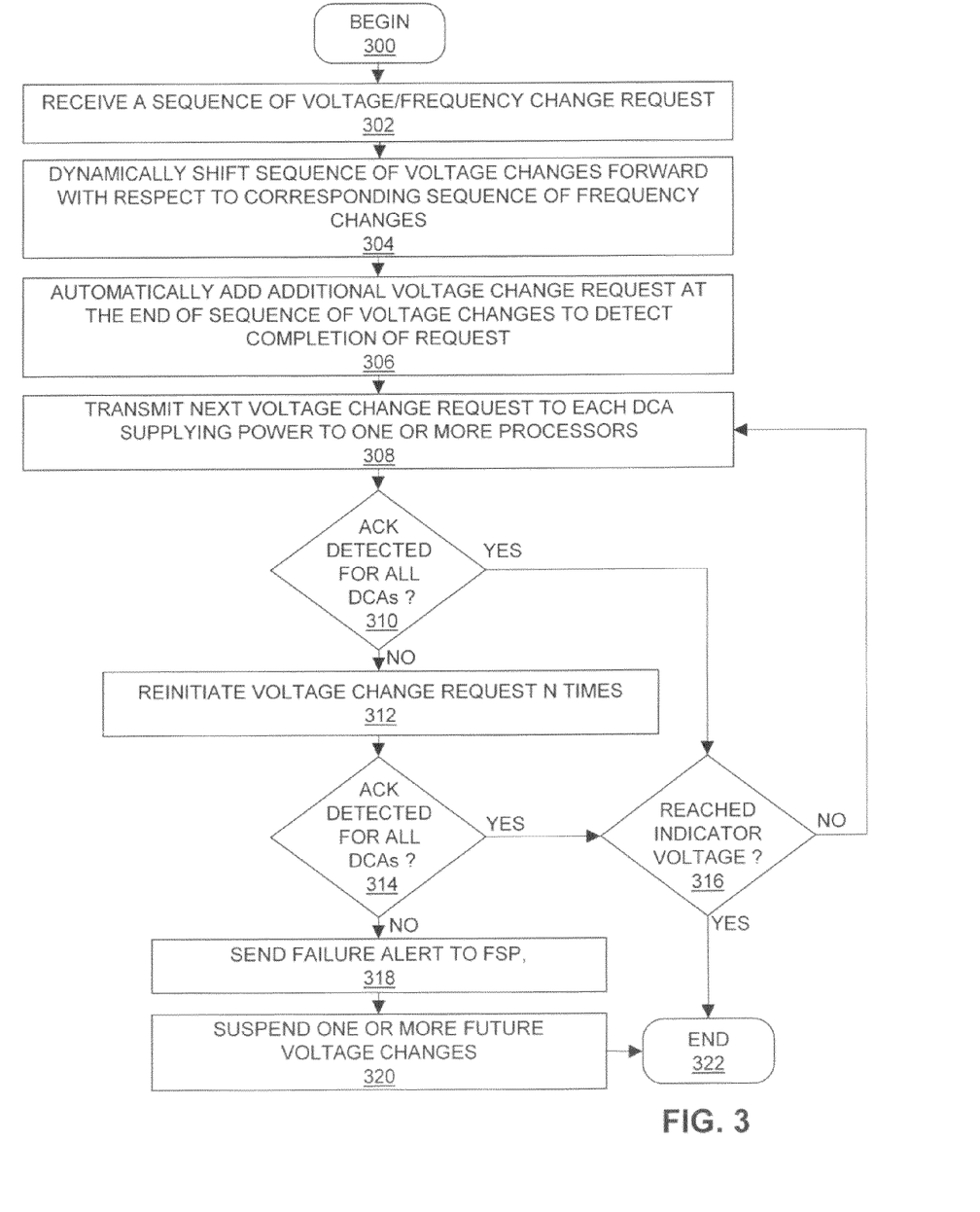
FIG. 3 is a flow chart illustrating the processes for managing one or more request (e.g. voltage change request and frequency change request) within a dynamic voltage and frequency scaling (DVFS) operation, according to one embodiment of the invention.
Figure 4:
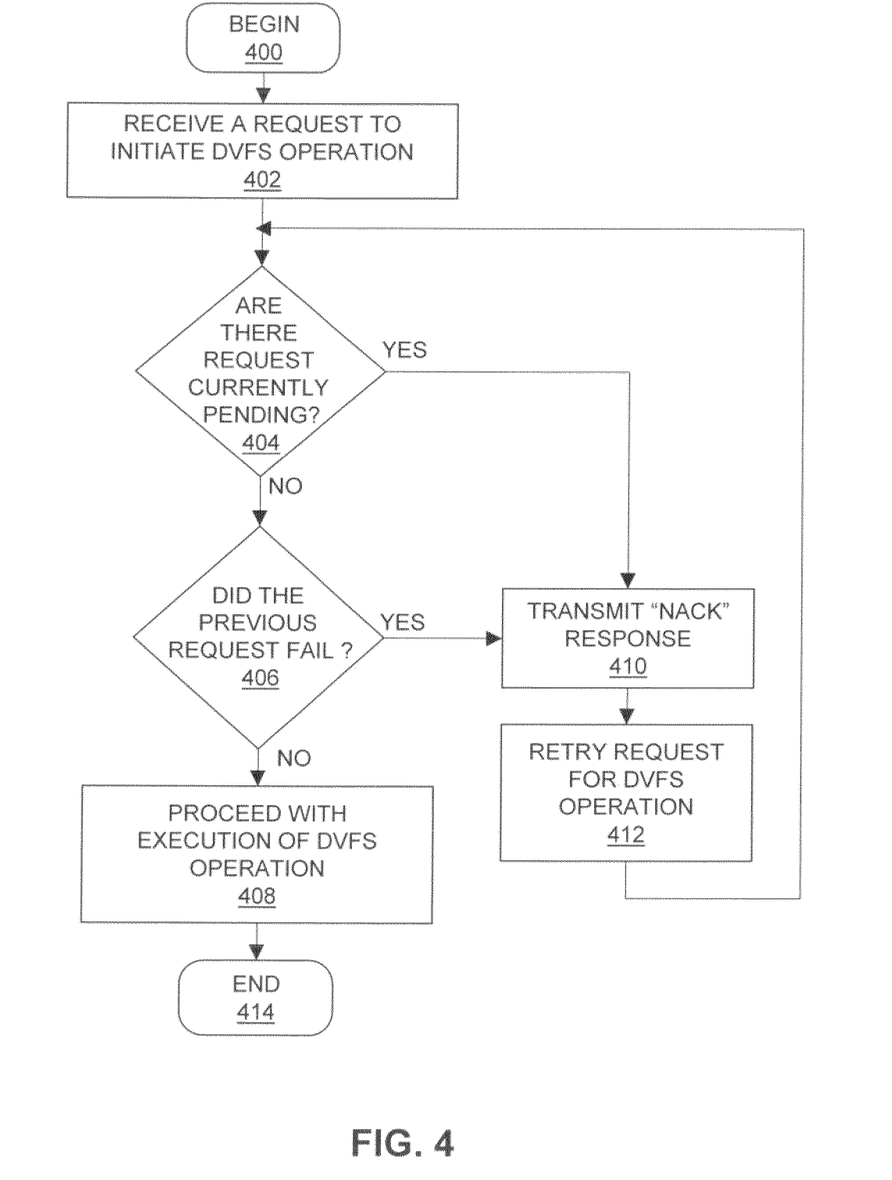
FIG. 4 is a flow chart illustrating the processes of the direct current assembly (DCA) for determining success or failure of requests for execution of a DVFS operation, in accordance with one embodiment of the invention.
Figure 5:
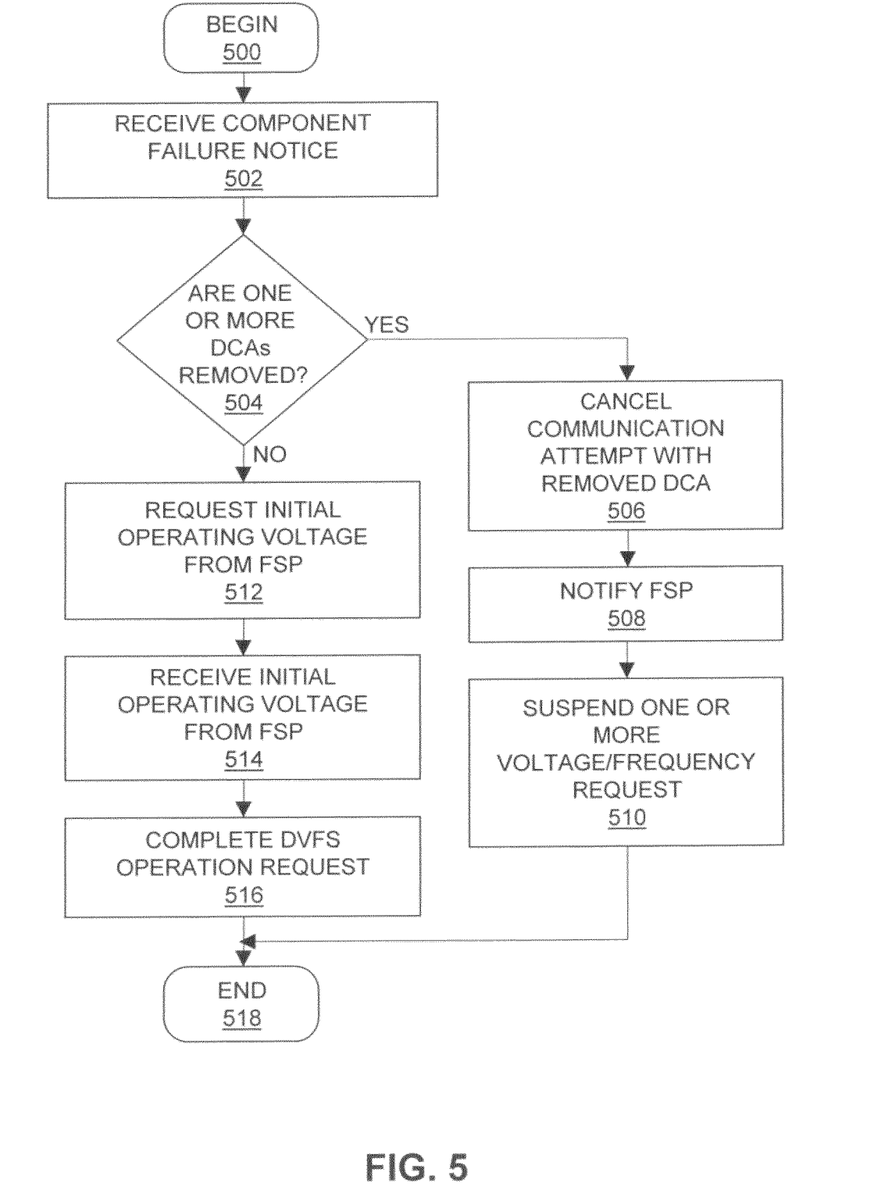
FIG. 5 is a flow chart illustrating the processes of the FSP for managing voltage change request when one or more components within the system architecture fail, according to one embodiment of the invention.

FIGS. 3-5 are flow charts illustrating various methods by which the above processes of the illustrative embodiments are completed. Although the methods illustrated in FIGS. 3-5 may be described with reference to components shown in FIGS. 1-2, it should be understood that this is merely for convenience and alternative components and/or configurations thereof can be employed when implementing the various methods. Key portions of the methods may be completed by VFCU 135 within the processors (processor A 130 and processor B 140), and/or by VR utility 145 executing on microcontroller A 172 and microcontroller B 192 within system architecture 100 (FIG. 1) and controlling specific operations of system architecture 100. The methods are thus described from the perspective of both VR utility 145 and components within system architecture 100.

FIG. 3 depicts the processes for managing one or more request (e.g. voltage change request and frequency change request) within a DVFS operation. The process of FIG. 3 begins at initiator block 300 and proceeds to block 302, at which a sequence of voltage/frequency change requests are received. At block 304 the sequence of voltage change requests are dynamically shifted forward with respect to the sequence of corresponding frequency change operations. An indicator voltage change request is automatically added at the end of the sequence of voltage change requests, at block 306, to signal the completion of a previous voltage change request and/or DVFS operation. One or more of the voltage change requests are transmitted to each DCA supplying power to one or more processors, at block 308.

A decision is made, at block 310, whether a succeed (ACK) response is detected from all DCAs. If a succeed response is detected from all DCAs the process continues to block 316. At block 316 a decision is made whether the indicator voltage is reached. If the indicator voltage is reached, the process continues to block 322. If the indicator voltage is not reached the process returns to block 308. If a succeed response is not detected from all DCAs, the process continues to block 312. The voltage change request is reinitiated N times (where N is a predefined number) at block 312. A decision is made, at block 314, whether an ACK is received from all DCAs. If a succeed response is detected from all DCAs, the process continues to block 316. If a succeed response is not detected (or a "NACK" response is received) the process continues to bock 318. At block 318 a failure alert is sent to the FSP. One or more future voltage change operations from the processor and/or to one or more DCAs are suspended at block 320. The process ends at block 322.

The process of determining success or failure of requests for execution of a DVFS operation is depicted in FIG. 4. The process of FIG. 4 begins at initiator block 400 and proceeds to block 402, at which a request is received to initiate a DVFS operation. A decision is made, at block 404, whether voltage change and/or frequency change requests are currently pending. If voltage change and/or frequency change requests are currently pending, the process continues to block 410. At block 410 a fail ("NACK) response is transmitted to the processor. A request for execution of the DVFS operation is resubmitted, at block 412, and the process returns to block 404. If voltage change and/or frequency change requests are not currently pending, at block 404, the process continues to block 406. A decision is made, at block 406, whether execution of a previous voltage change request and/or frequency change request failed. If a previous voltage change request and/or frequency change request failed, the process continues to block 410. If a previous voltage change request and/or frequency change request has not failed, VR utility enables execution of the voltage change request and/or DVFS operation, at block 408. The process ends at block 414.

FIG. 5 depicts the processes for managing voltage change request when one or more components within the system architecture fail. The process of FIG. 5 begins at initiator block 500 and proceeds to block 502, at which a component failure notice is received. A decision is made, at block 504, whether one or more DCAs are removed. If one or more DCAs are removed the process to continues block 506. At block 506 communication attempts with the removed DCA are cancelled. The FSP is notified at block 508. At block 510 one or more voltage change request and/or frequency change request transmitted to the removed DCA are cancelled. If one or more DCAs are not removed, at block 504, the process continues block 512. At block 512 an initial operating voltage is requested from the FSP. The initial operating voltage is received from the FSP at block 514. The voltage change request and/or DVFS operation is completed, at block 516, relative to the initial operating voltage. The process ends at block 518.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for managing operations associated with one or more voltage change requests and one or more frequency change requests in a data processing system having one or more processors, the method comprising:
   a processor receiving one or more of a voltage change request and a frequency change request;
   detecting a first sequence associated with one or more voltage change requests and a second sequence associated with one or more frequency change requests;
   dynamically modifying the first sequence and the second sequence, wherein modifying the first sequence and the second sequence includes shifting the one or more voltage change requests forward relative to one or more corresponding frequency change requests;
   automatically inserting an indicator voltage change at an end of the first sequence;
   detecting execution of the indicator voltage change; and
   determining when an indicator voltage associated with the indicator voltage change is successfully reached, wherein detection of the indicator voltage signifies completion of one or more previous voltage change requests.

2. The method of claim 1, further comprising:
   identifying one or more direct current assemblies (DCAs) supplying power to the one or more processors;
   determining when one or more of the voltage change request and the frequency change request are pending within a direct current assembly (DCA); and
   in response to the voltage change request and the frequency change request being associated with a dynamic voltage and frequency scaling (DVFS) operation, enabling the DCA to transmit one of a succeed response and a fail response when the DVFS operation is received by the DCA, wherein the succeed response indicates execution of the DVFS operation is commencing and the fail response indicates execution of the DVFS operation is not currently commencing.

3. The method of claim 2 further comprising:
   enabling transmission of a fail response from the DCA to the processor in response to a previous DVFS operation being the recipient of the fail response.

4. The method of claim 2, further comprising:
   in response to the fail response being transmitted, resubmitting the DVFS operation to the DCA N times, wherein N is a predetermined number; and
   in response to the succeed response being transmitted from the DCA, enabling execution of the DVFS operation.

5. The method of claim 1, further comprising:
   determining when the succeed response is received from all direct current assemblies (DCAs);
   in response to the succeed response being received from all DCAs, enabling execution of one or more of a pending DVFS operation and a pending voltage change requests; and
   in response to one or more fail responses being received from one or more DCAs, sending a fail alert to a flexible support processor (FSP).

6. The method of claim 1, further comprising:
   determining when one or more DCAs are removed;
   in response to one or more DCAs being removed:
      cancelling a communication attempt between one or more processors and a removed DCA;
      transmitting a notification to the FSP, wherein the notification identifies the one or more removed DCAs; and
      enabling the FSP to prevent transmission of future DVFS operations from the processor to the removed DCA.

7. The method of claim 6, further comprising:
   in response to a component failure occuring during or prior to the DVFS operation and the one or more DCAs not being removed:
   requesting an initial operating voltage from the FSP;
   receiving the initial operating voltage from the FSP; and
   enabling execution of the voltage change request relative to the initial operating voltage.

8. A data processing system comprising:
   one or more processors;
   a voltage and frequency control unit (VFCU);
   a direct current assembly (DCA);
   a voltage regulator module (VRM);
   a utility executing on the direct current assembly and which comprises instructions that execute to manage operations associated with one or more voltage change and one or more frequency changes, said instructions providing logic for:
   receiving one or more of a voltage change request and a frequency change request;
   detecting a first sequence associated with one or more voltage change requests and a second sequence associated with one or more frequency change requests;
   dynamically modifying the first sequence and the second sequence, wherein modifying the first sequence and the second sequence includes shifting the one or more voltage change requests forward relative to one or more corresponding frequency change requests;
   automatically inserting an indicator voltage change at an end of the first sequence;
   detecting execution of the indicator voltage change; and
   determining when an indicator voltage associated with the indicator voltage change is successfully reached, wherein detection of the indicator voltage signifies completion of one or more previous voltage change requests.

9. The data processing system of claim 8, further comprising logic for:
   identifying one or more direct current assemblies (DCAs) supplying power to the one or more processors;
   determining when one or more of the voltage change request and the frequency change request are pending within a direct current assembly (DCA); and
   in response to the voltage change request and the frequency change request being associated with a dynamic voltage and frequency scaling (DVFS) operation, enabling the DCA to transmit one of a succeed response and a fail response when the DVFS operation is received by the DCA, wherein the succeed response indicates execution of the DVFS operation is commencing and the fail response indicates execution of the DVFS operation is not currently commencing.

10. The data processing system of claim 9, further comprising logic for:
enabling transmission of a fail response from the DCA to the processor in response to a previous DVFS operation being the recipient of the fail response.

11. The data processing system of claim 8, further comprising logic for:
in response to the fail response being transmitted, resubmitting the DVFS operation to the DCA N times, wherein N is a predetermined number; and
in response to the succeed response being transmitted from the DCA, enabling execution of the DVFS operation.

12. The data processing system of claim 8, further comprising logic for:
determining when the succeed response is received from all direct current assemblies (DCAs);
in response to the succeed response being received from all DCAs, enabling execution of one or more of a pending DVFS operation and a pending voltage change requests; and
in response to one or more fail responses being received from one or more DCAs, sending a fail alert to a flexible support processor (FSP).

13. The data processing system of claim 8, further comprising logic for:
determining when one or more DCAs are removed; and
in response to one or more DCAs being removed:
cancelling a communication attempt between one or more processors and a removed DCA;
transmitting a notification to the FSP, wherein the notification identifies the one or more removed DCAs; and
enabling the FSP to prevent transmission of future DVFS operations from the processor to the removed DCA.

14. The data processing system of claim 13, further comprising logic for:
in response to a component failure occuring during or prior to the DVFS operation and the one or more DCAs not being removed:
requesting an initial operating voltage from the FSP;
receiving the initial operating voltage from the FSP; and
enabling execution of the voltage change request relative to the initial operating voltage.

15. A computer program product comprising:
a tangible computer-readable storage device; and
program code on the tangible computer-readable storage device that when executed by a computer device having one or more processors provides the functions of:
receiving one or more of a voltage change request and a frequency change request;
detecting a first sequence associated with one or more voltage change requests and a second sequence associated with one or more frequency change requests;
dynamically modifying the first sequence and the second sequence, wherein modifying the first sequence and the second sequence includes shifting the one or more voltage change requests forward relative to one or more corresponding frequency change requests;
automatically inserting an indicator voltage change at an end of the first sequence;
detecting execution of the indicator voltage change; and
determining when an indicator voltage associated with the indicator voltage change is successfully reached, wherein detection of the indicator voltage signifies completion of one or more previous voltage change requests.

16. The computer program product of claim 15, further comprising program code for:
identifying one or more direct current assemblies (DCAs) supplying power to the one or more processors;
determining when one or more of the voltage change request and the frequency change request are pending within a direct current assembly (DCA); and
in response to the voltage change request and the frequency change request being associated with a dynamic voltage and frequency scaling (DVFS) operation, enabling the DCA to transmit one of a succeed response and a fail response when the DVFS operation is received by the DCA, wherein the succeed response indicates execution of the DVFS operation is commencing and the fail response indicates execution of the DVFS operation is not currently commencing.

17. The computer program product of claim 16, further comprising program code for:
enabling transmission of a fail response from the DCA to the processor in response to a previous DVFS operation being the recipient of the fail response.

18. The computer program product of claim 16, further comprising program code for:
in response to the fail response being transmitted, resubmitting the DVFS operation to the DCA N times, wherein N is a predetermined number; and
in response to the succeed response being transmitted from the DCA, enabling execution of the DVFS operation.

19. The computer program product of claim 15, further comprising program code for:
determining when the succeed response is received from all direct current assemblies (DCAs);
in response to the succeed response is received from all DCAs, enabling execution of one or more of a pending DVFS operation and a pending voltage change requests;
in response to one or more fail responses being received from one or more DCAs, sending a fail alert to a flexible support processor (FSP);
determining when one or more DCAs are removed; and
in response to one or more DCAs are removed:
cancelling a communication attempt between one or more processors and a removed DCA;
transmitting a notification to the FSP, wherein the notification identifies the one or more removed DCAs; and
enabling the FSP to prevent transmission of future DVFS operations from the processor to the removed DCA.

20. The computer program product of claim 19, further comprising program code for:
in response to a component failure occuring during or prior to the DVFS operation and the one or more DCAs not being removed:
requesting an initial operating voltage from the FSP;
receiving the initial operating voltage from the FSP; and
enabling execution of the voltage change request relative to the initial operating voltage.

* * * * *